United States Patent Office 3,184,380
Patented May 18, 1965

3,184,380
STABILIZATION OF CONCENTRATED SUSPENSIONS OF PESTICIDE PARTICLES
Verle W. Woods, P.O. Box 574, Yakima, Wash.
No Drawing. Filed Apr. 1, 1963, Ser. No. 269,753
4 Claims. (Cl. 167—43)

This is a continuation in part of U.S. application Ser. No. 27,506, filed May 9, 1960, now abandoned.

The present invention relates to a process of preparing suspensions of non-water soluble organic chemicals. It is particularly applicable to those chemicals that are used as insecticides, acaricides, herbicides and fungicides. Such chemicals are referred to hereinafter generally as pesticides.

In my United States Letters Patent No. 2,957,803, granted October 25, 1960, on Method of Preparing Suspension of Insecticides, I have disclosed and claimed a method of forming a stable suspension of non-water soluble organic pesticides comprising the steps of forming a liquid emulsion of fat or oil in water made heavier by a substance soluble in the water, introducing the solids into the liquid emulsion, then breaking up the solids in the liquid emulsion, while agitating the liquid and solids together, to particles of a fineness of the order of 5 to 15 microns. In this application, as in the above patent, the term fat is used broadly to include mineral oil, vegetable oils and those of animal origin.

I have discovered that I am now able to improve the uniformity of the suspension, when the chemicals suspended have certain characteristics, by further simple process steps. Certain of the water insoluble pesticide chemicals have a crystalline form in the range of temperatures at which they are stored and used. If it also (1) has a melting point below its decomposition temperature and below the boiling point of the suspending solution, or (2) is substantially totally soluble in the coating fat below the boiling point of the suspending liquid and below its decomposition temperature, then the chemical is amenable to the present process, the resulting suspension is fully stable and the pesticide is distributed as individual fat coated crystals in the suspension.

A further practical condition preliminary to the application of the instant invention is that the concentration of solid particles in suspension must not exceed that concentration at which the suspension is capable of being continuously agitated at all temperatures up to and including that at which the pesticide either dissolves in the coating fat or melts.

The following water insoluble pesticides have characteristics that fit them for the process:

| Common names: | Chemical names |
|---|---|
| Copper naphthenate | Cupric naphthenate. |
| DDT | Dichlorodiphenyltrichloroethane. |
| Dinitrocresol | 4,6-dinitro-o-cresol, 2-methyl-4,6-dinitro-phenol. |
| Ovex (Ovotran) | Parachlorophenylparachlorobenzene. |
| Paradichlorobenzene | 1,4-dichlorobenzene. |
| Phenothiazine | Dibenzothiazine, thiodiphenylamine. |
| Sulphenone | p-Chlorophenyl phenyl sulphone. |

According to my invention the suspension was made as follows:

The following ingredients were used—
800 lbs. fat (mineral oil, margarine or lard)
140 lbs. emulsifier (½ Rohm & Haas Triton X-155, ¼ Retzloff Chemical Co. Sporto 217, ¼ Retzloff Chemical Co. Sporto 221)
240 lbs. water weighting material (urea or wood sugar)
1220 lbs. water
1600 lbs. water insoluble organic pesticide crushed or broken up so it can be circulated as described in my prior patent.

The above materials are placed in a tank and agitated continuously. The mechanisms shown in my prior patent are used to circulate and break up the solid pesticide lumps, the circulation at first being at a high rate. The particles as they are broken up become fat coated and uniformly dispersed through the liquid. After circulation at an elevated temperature (120 degrees F.) for a period of three to four hours the temperature is lowered and the circulation is continued until the desired fineness is reached as described in my prior patent. All of this operation is essentially that described in my prior patent hereinbefore identified.

After the operation described above has reduced the pesticide to small particle size as described in my prior patent, I then raise the temperature of the entire mixture gradually until the pesticide either melts or is dissolved in the coating fat or oil. For example, with DDT the solubility of this pesticide in fat or oil increases with a rise in temperature, so that, if broken up as fine particles, each coated with fat or oil, there is enough fat or oil surrounding and in contact with the fine particle to dissolve it. The melting point of DDT is very close to its decomposition temperature. The melting point is about 27 degrees F. and it decomposes at 230 degrees F. DDT is crystalline normally in the temperature ranges at which the suspension is stored and used. This temperature range extends from as low as 30 degrees F. up to 130 degrees F. where the containers are exposed to the summer sun in the fields.

When the DDT has been reduced to desired particle size by the process of my prior patent each particle is fat or oil coated. At this point the temperature of the suspension is gradually increased and the agitation in the tank is continued until the temperature is brought up to approximately 165 degrees F. At such a temperature the DDT in each fat unit is dissolved completely. I continue the agitation and then gradually reduce the temperature of the suspension until it is of the order of 100 degrees F. The cooling causes the DDT to recrystallize within the fat or oil. The crystal shape of the DDT thus formed is a short rod. Uniform shapes of the crystals are assured because each globule of fat or oil and DDT is surrounded by the same emulsifier and suspended in the same medium as all of the globules. The crystals appear to be fatter when the cooling is more rapid and slimmer when the cooling is slower.

A factor of prime importance in the present process is continuous agitation of the suspension throughout all steps of the process, including the heating steps. In the case of most pesticides, this agitation or pumping will prevent crystals from knitting together or joining and will assure uniform crystalline structure as an end result. However, there are chemical pesticides having the necessary melting point characteristics or capable of dissolving in fat as desired, which are unsuitable for the instant method at concentrations in suspension above a given level. This is due to the mechanical impossibility of agitating such suspensions throughout the process steps.

An example of such a substance is IPC (isopropyl-N-phenyl-carbamate) a pre-emergence herbicide having a melting point of 84 degrees C. In experiments involving the instant process in an application of a 46% concentration of IPC in an aqueous suspension, the suspension was found to thicken when heated, and no pumping or agitation of the solution was mechanically possible after reaching a temperature of 54 degrees C., long prior to reaching the melting point of the substance. Further experimentation has shown the complete adaptability of the same chemical substance in suspensions having a concentration of 30% IPC. The upper limit of concentration of IPC which will allow the necessary agitation to be continued throughout the process is between 30% and 40%, depending upon the mechanical capability of the available pump or other agitating device.

In the case of IPC, it appeared that the crystals formed long solid needles when heated, taking more space and reducing the fluidity of the suspension. At a lesser concentration, the needles remained capable of being agitated because of the additional quantity of suspending liquid. Any chemical to which this invention is applied must be maintained at a concentration where the suspension can be thoroughly agitated at all temperatures encountered in the process.

For purposes of the instant disclosure, the word "agitate" is intended to mean the vigorous stirring, mixing or moving of a suspension so as to continuously alter the relative positions of the particles in suspension. While such agitation is accomplished quite readily by a recirculating pump, various equivalent alternatives might be substituted with equally desirable results.

The operation of the device for breaking up the original DDT lumps is discontinued during the re-crystallizing of the DDT. Agitation is continued, however, and helps seeding of the crystals by shock. It also avoids knitting of crystals together by growth of crystal to crystal when two globules remain very close together.

DDT is a good example of a pesticide that fits in the process by reason of its increased solubility in the fat or oil as the temperature is raised and its crystalline structure at the temperatures of storage and use. The same process applies equally well to other pesticides where the solid melts below the boiling point of the suspending solution even though it is quite insoluble in the fat. Ovex, for example, is very slightly soluble in mineral oil. The characteristic shape of the crystal is a flat plate. It melts at about 187 degrees F. which is well below the boiling temperatures of the water-urea solution. Its decomposition temperature is well above the boiling temperature of water.

When making a suspension of Ovex I use the same proportions of materials set out hereinbefore. The reduction of the material to particle size of the order of 5 to 15 microns was carried out in the manner described in my prior patent. The circulation was then stopped and agitation was continued while the temperature of the mass was gradually raised to 190 degrees F. and the little oil coated particles were thus melted. The Ovex being slightly soluble in mineral oil (2.5 grams in 100 cc.) could not be dissolved in the coating of oil but it was liquified. Then the suspension was cooled gradually to 100 degrees F. while the agitation was continued and the plate-like crystals were formed in the oil coating.

The same method is successful where the pesticides have the characteristics hereinbefore set forth, that is, they are crystalline and insoluble or poorly soluble in fat in the range of temperature at which they will be stored and used and they are either increasingly soluble in the fat with increased temperature and can be dissolved therein above the use range of temperature, or they melt below the boiling point of the suspension. The several pesticides mentioned hereinbefore have these characteristics, although in certain instances the maximum concentration of pesticide in solution is limited by the above described mechanical consideration.

It is believed that the nature and advantages of my invention will be apparent from the foregoing description.

Having described my invention, I claim:

1. A method of forming a stable suspension of a non-water soluble organic pesticide which is (1) normally crystalline and insoluble in fat in the range of temperatures between 30 degrees and 130 degrees F. and (2) either soluble in fat at a temperature above 130 degrees F. or melts at a temperature below the boiling point of the suspending liquid, the temperature at which the pesticide becomes soluble in fat or melts being below its decomposition temperature, and (3) at a concentration in suspension which is capable of remaining in a fluid state suitable for agitation at all temperatures below that at which it either dissolves or melts, which comprises:
   forming a liquid emulsion of fat in a water solution heavier than water alone;
   introducing the solid pesticide into the emulsion;
   grinding the solid pesticide in the emulsion to a fineness of the order of 5 to 15 microns, thereby adhering a coating of fat to the solids;
   simultaneously agitating and heating the suspension above 130 degrees F. but below the boiling point of the suspending liquid until the solid particles disappear;
   and then gradually cooling the suspension, while agitating it, to a temperature below 130 degrees F., thereby forming crystals within the fat globules of the suspension.

2. A method of forming a stable suspension of a non-water soluble organic pesticide which is (1) normally crystalline and insoluble in fat in the range of temperatures between 30 degrees and 130 degrees F. and (2) either soluble in fat at a temperature above 130 degrees F. or melts at a temperature below the boiling point of the suspending liquid, the temperature at which the pesticide becomes soluble in fat or melts being below its decomposition temperature, and (3) at a concentration in suspension which is capable of remaining in a fluid state suitable for agitation at all temperatures below that at which it either dissolves or melts, which comprises:
   agitating and heating a suspension of fat coated fine particles of the pesticide suspended in a water solution heavier than water until the solid particles disappear;
   then gradually cooling the suspension while agitating it until it reaches a temperature below 130 degrees F., thereby forming crystals of the pesticide with fat coatings in the suspension.

3. In the method of forming a suspension of DDT in water which comprises grinding the DDT in a fat in water emulsion until the particles have a fineness of the order of 5 to 15 microns and are coated with the fat the following additional steps:
   heating the suspension and agitating it until the fat globules around the particles dissolve the particles;
   then gradually cooling the suspension and agitating it, thereby forming crystals of DDT coated within the fat globules of the fat in water emulsion.

4. In the method of forming a suspension of Ovex in water which comprises grinding the Ovex in a fat in water emulsion until the particles have a fineness of the order of 5 to 15 microns and are coated with the fat, the following additional steps:
   heating the suspension above the melting point of Ovex and agitating it until the Ovex particles are melted;
   then gradually cooling the suspension and agitating it, thereby forming crystals of Ovex within the fat globules of the fat in water emulsion.

References Cited in the file of this patent

UNITED STATES PATENTS

| | | |
|---|---|---|
| 1,847,540 | Sanders | Mar. 1, 1932 |
| 2,349,814 | Deonier | May 30, 1944 |
| 2,957,803 | Woods | Oct. 25, 1960 |
| 2,966,440 | Gerolt | Dec. 27, 1960 |
| 2,976,210 | Cosby | Mar. 21, 1961 |
| 3,008,871 | Feinberg | Nov. 14, 1961 |